United States Patent [19]

Parnello

[11] Patent Number: 4,893,334
[45] Date of Patent: Jan. 9, 1990

[54] INTERCOMMUNICATION SYSTEM FOR TELEPHONES

[75] Inventor: Nicholas G. Parnello, Rockford, Ill.
[73] Assignee: Power Play, Chicago, Ill.
[21] Appl. No.: 90,741
[22] Filed: Aug. 28, 1987
[51] Int. Cl.$^4$ .......................... H04M 9/02; H04Q 5/02
[52] U.S. Cl. .................................... 379/157; 379/159; 379/217
[58] Field of Search ............... 379/103, 156, 157, 159, 379/160, 162, 163, 167, 170, 171, 176, 177, 182, 187, 217

[56] References Cited

U.S. PATENT DOCUMENTS

| | | |
|---|---|---|
| 3,725,601 | 4/1973 | Jetzt et al. |
| 4,060,700 | 11/1977 | Magnusson . |
| 4,332,983 | 6/1982 | Vakili . |
| 4,377,726 | 3/1983 | Schiffbauer et al. |
| 4,459,434 | 7/1984 | Benning et al. ..................... 379/160 |
| 4,538,031 | 8/1985 | Benning et al. ..................... 379/103 |
| 4,578,540 | 3/1986 | Borg et al. . |
| 4,588,864 | 5/1986 | Carter et al. ........................ 379/157 |
| 4,636,589 | 1/1987 | Lee . |
| 4,769,837 | 9/1988 | McCormick et al. ............... 379/160 |
| 4,821,319 | 4/1989 | Middleton et al. .................. 379/159 |

FOREIGN PATENT DOCUMENTS 8606570 11/1986 PCT Int'l Appl. ............... 379/160

OTHER PUBLICATIONS

"Super Phone", *Popular Mechanics*, Dec. 1982, p. 122.

Primary Examiner—Jin F. Ng
Assistant Examiner—Bonita Lewis
Attorney, Agent, or Firm—Welsh & Katz, Ltd.

[57] ABSTRACT

An intercom system for use with a plurality of telephones on a single extension includes a single master station and a plurality of slave stations. The master station is connected so as to interrupt the telephone line pair to and from a central exchange. Each slave station is preferably associated with a handset that is on the extension. When the extension is not being used for intercom service or for an outside call, any telephone handset on the extension that has a keypad can initiate a signal that is received and decoded in the master unit. When the master station receives such a signal, it disconnects the line to the telephone exchange from the extension and connects the telephone exchange to a circuit that detects incoming calls so that they can be signaled to users. The master station also sends a signal to each slave station that enables the intercom function. Speech originating from the handset that called for intercom is broadcast over a loud speaker at each slave station until one or more other handsets on the extension are picked up to respond to the page. The presence of an additional handset is detected at the master station which switches to the intercom mode. When the intercom use is complete and all handsets are returned in the cradles, the master station detects this fact and reestablishes the connection of the extension to the telephone exchange. The presence of a master station allows the addition of options such as speed dialing, overall alarming, and message recording.

15 Claims, 5 Drawing Sheets

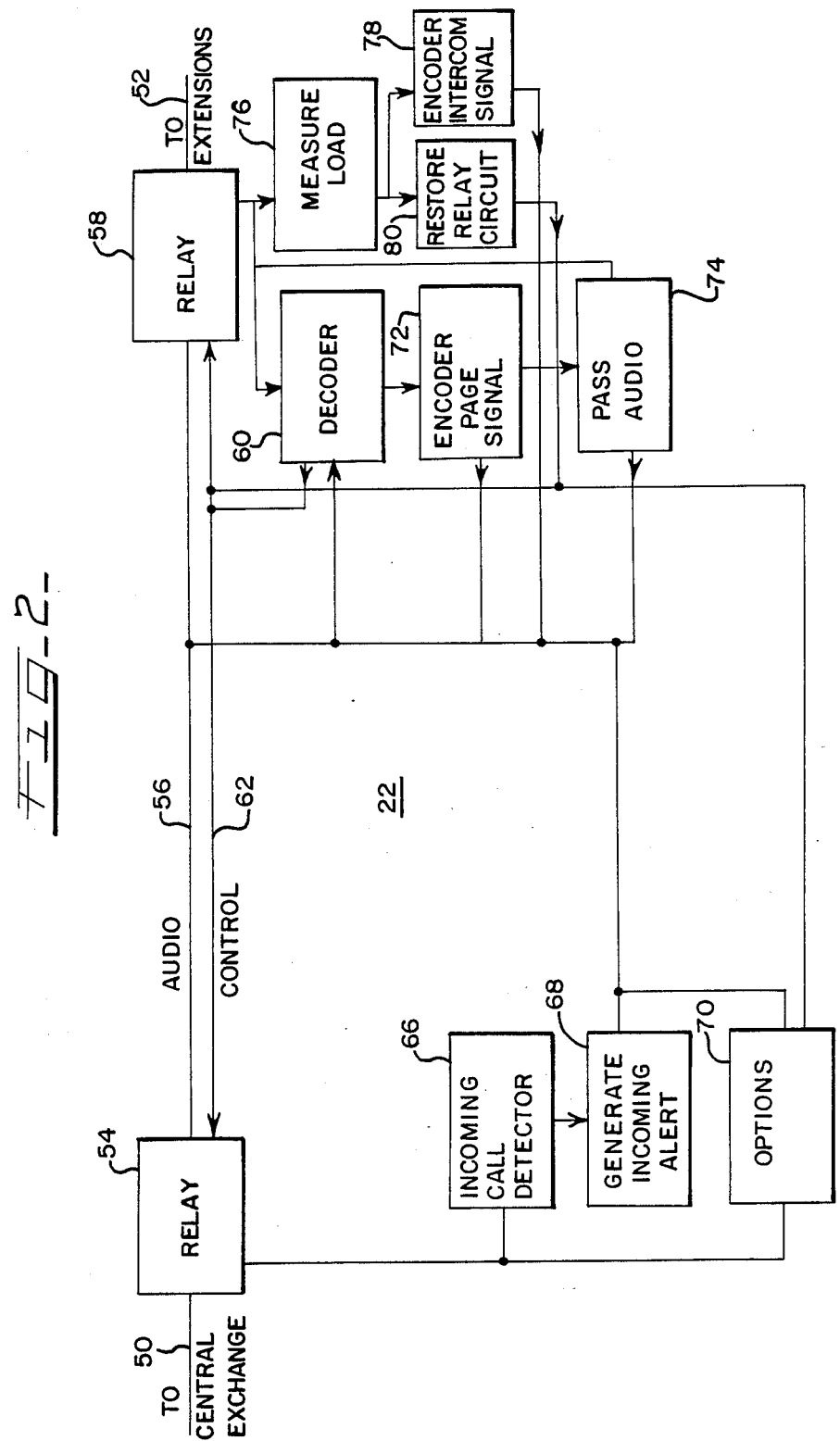

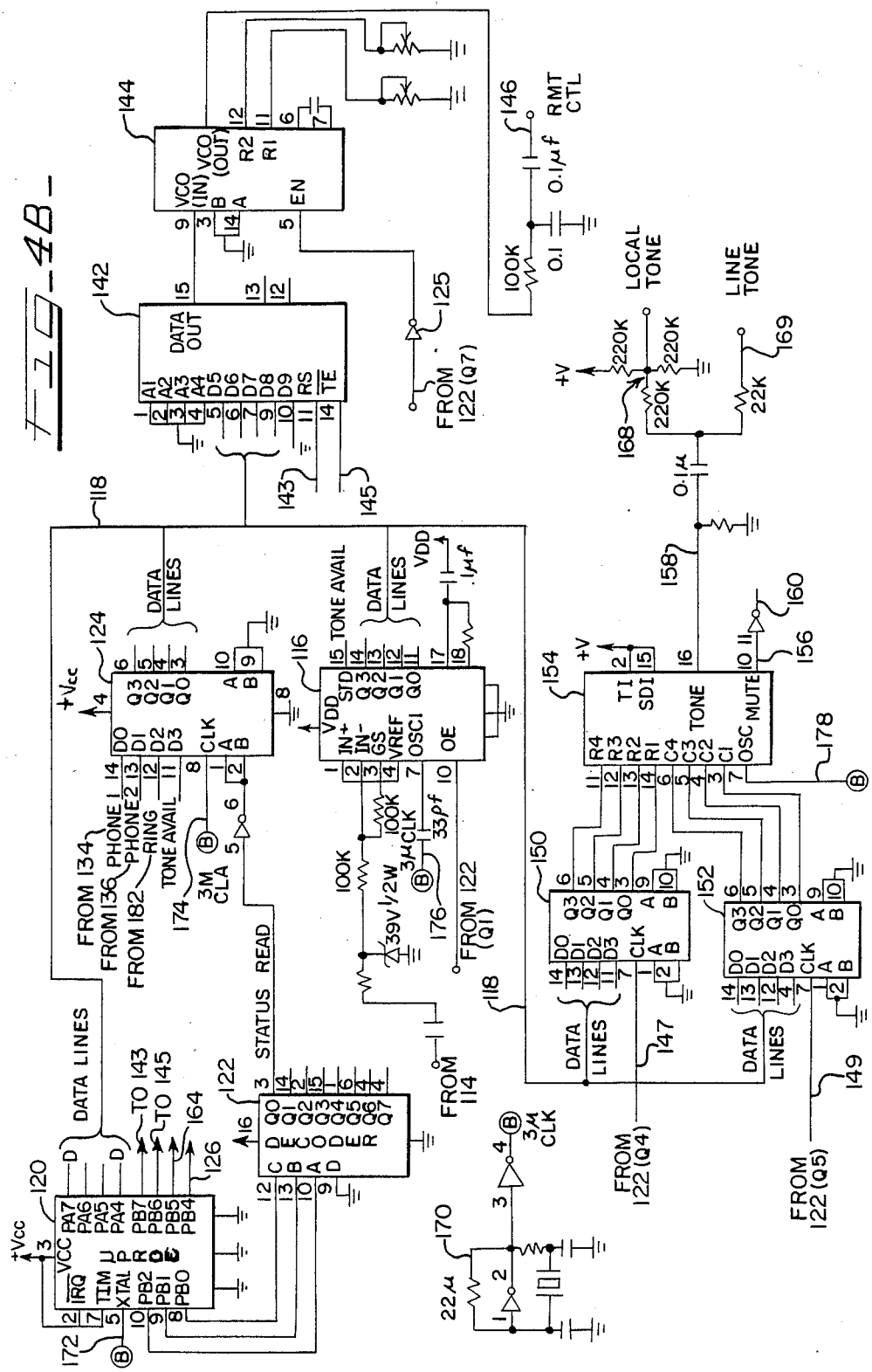

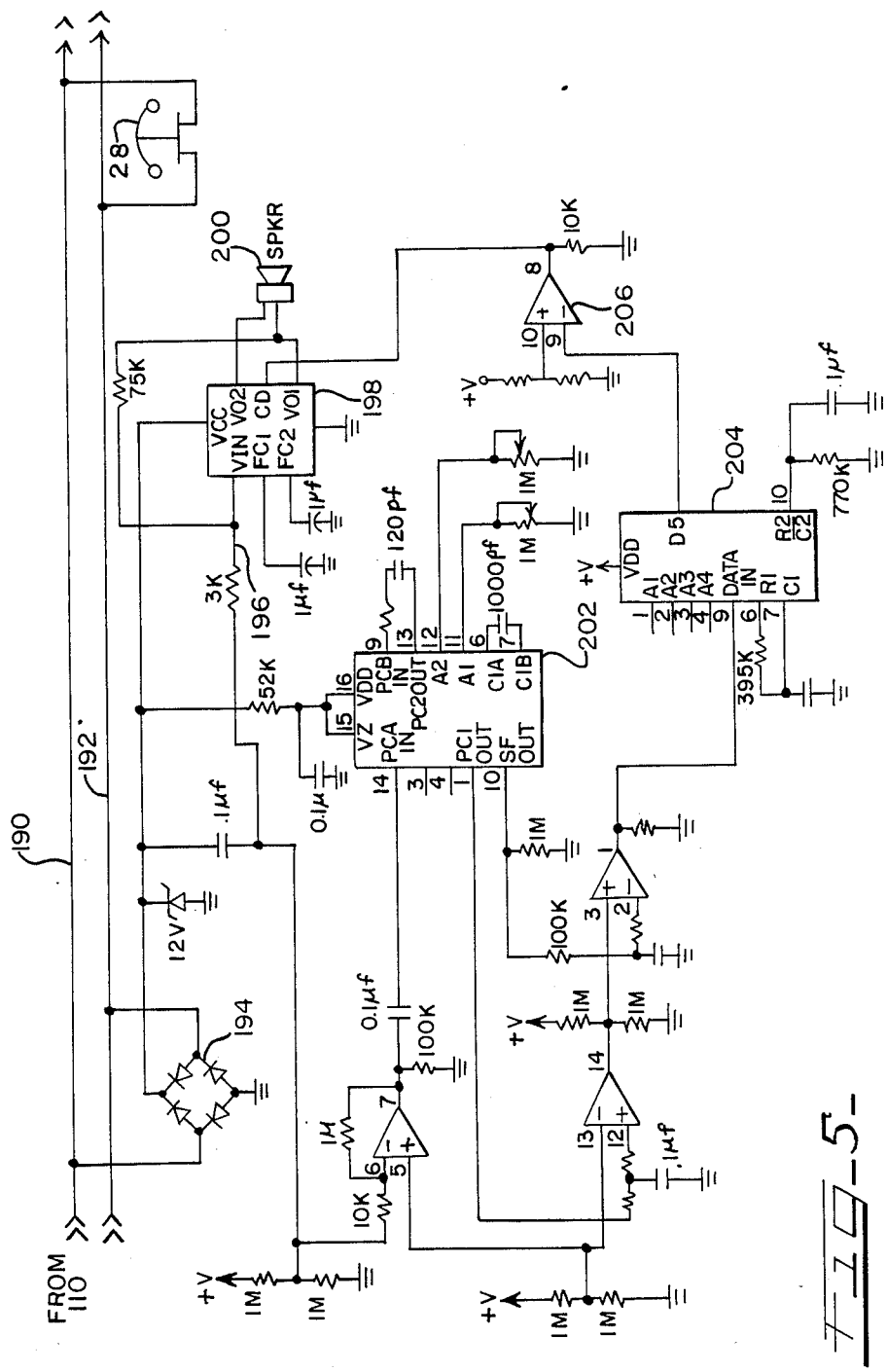

4,893,334

INTERCOMMUNICATION SYSTEM FOR TELEPHONES

BACKGROUND OF THE INVENTION

This invention relates to a system for using conventional telephones as part of an intercommunication system. In particular, this invention relates to an inexpensive and simple apparatus for using extension telephones as an intercom system.

Intercom systems have long been regarded as useful additions to a telephone system. An example of a patent disclosing such an intercom system is Jetzt et al., U.S. Pat. No. 3,725,601, entitled "Direct Station Selection Private Intercom Exchange System." Jetzt et al. disclose a modified telephone handset that provides some of the features of a private branch exchange (PBX). One of the features provided by Jetzt et al. is the provision of intercom lines, with one intercom line plus a single line for each telephone that is adapted for interconnection to other telephones in the intercom system. In the system taught by Jetzt et al., for L outside lines and N inside handsets, each handset must be supplied by a cable containing (5L+3N+4) conductors. Thus, in the simplest system employing one outside line and N internal extensions, Jetzt et al., would require (3N+9) conductors. This represents a disadvantage that is overcome by the present invention.

Magnusson, U.S. Pat. No. 4,060,700, entitled "Two-Party Telephone System," discloses a two-party telephone system that features external calls to and from each of the two telephone sets of the system and also a speech connection between the telephone sets. Magnusson uses a dedicated wire pair for the speech connection between the telephone sets. This extra wire pair represents a disadvantage that is overcome by the present invention.

The same distinctions apply to U.S. Pat. Nos. 4,538,031 and 4,459,434, which are both issued to Benning et al. These patents teach an intercom system that has dedicated wires, a disadvantage that is overcome by the invention.

Lee, U.S. Pat. No. 4,636,589, entitled "In-Line Telephone Intercome System," teaches an intercom system that uses two or more telephones on the same line as the intercom transmitters and receivers. However, it is not apparent from an inspection of this patent how the intercom system can work in the case of an incoming call or how the intercom system can overcome the dial tone that results when one or the other of the telephones is picked up. A properly functioning intercom system that uses the telephone lines should hold an incoming call when the intercom system is in use and it should permit the intercom users to pick up the incoming call.

SUMMARY OF THE INVENTION

It is an object of the present invention to provide an improved intercom system using a plurality of telephones on the same pair of wires.

It is a further object of the present invention to provide an improved telephone intercom system that is prevented from interfering with an outside call that is in process.

It is another, object of the present invention to provide an improved intercom system using a single pair of wires that is capable of holding an outside call so that the intercom user can switch from intercom mode to answer the incoming call.

Other objects will become apparent in the course of a detailed description of the invention.

An intercom system for use with a plurality of handsets on a single extension includes a master station and a plurality of slave stations. The master station is connected so as to interrupt the telephone line pair to and from the central exchange. Each slave station is preferably associated with a handset that is on the extension, although it is possible to locate and use a slave station without an associated handset. It is also possible to have a handset on the extension without an associated slave station.

When the extension is not being used for intercom service or for an outside call, any telephone handset on the extension that has a dual-tone/multiple-frequency (DTMF) keypad or capability can initiate a signal that is received and decoded in the master station. This is preferably one of the special-function keys on the conventional DTMF keypad, either the asterisk (*) or the pound sign (), although other available key combinations may be used. When the master unit receives such a signal, it disconnects the telephone central exchange from the extension. The receipt of an incoming call will be signaled to users. The master unit also sends a signal to each slave unit that initiates a paging sequence. Speech originating from the handset that called for intercom is broadcast over a loudspeaker at each slave station. The paging mode continues until one or more of the other handsets on the extension are picked up to respond to the page. The presence on the line of an additional handset is detected by the master station, which switches to an intercom mode. The intercom mode permits all of the handsets that are picked up in a position to engage in two-way voice communication, while the loudspeakers are turned off. When the intercom mode is complete and all handsets are returned to the cradle, the master station detects this fact and reconnects the extension to which the handsets are connected to the telephone exchange.

The master station is also equipped to detect the presence of an incoming call, which is permitted to ring while its presence is communicated to the open handsets by a tone. If all the handsets are returned to their cradles by the users, the master station will pass the call as though the intercom had not been in use. As an option, it is also possible to allow the master station to respond to a DTMF signal from a handset to pass the incoming call without requiring that the handsets be cradled, or to place the incoming call on hold.

The presence of a master station allows the addition of options such as overall alarming, in which any handset on the extension can originate the signal which causes the master station to sound an alarm at all slave stations. The system is also adapted to allow any handset on the extension to direct the speed dialing of a limited number of telephone numbers that are stored at the master station. The master station may be combined with a call recorder, a device for playing music when calls are on hold, or with a remote enable at a slave station to allow remote control of electric power at the slave station.

BRIEF DESCRIPTION OF THE DRAWINGS

FIG. 2 is a block diagram of the master station of the present invention.

FIGS. 4A and 4B are a detailed circuit diagram of the master station illustrated in FIG. 2.

FIG. 5 is a detailed circuit diagram of the slave station illustrated in FIG. 3.

DETAILED DESCRIPTION OF THE PREFERRED EMBODIMENT

Figure 1:
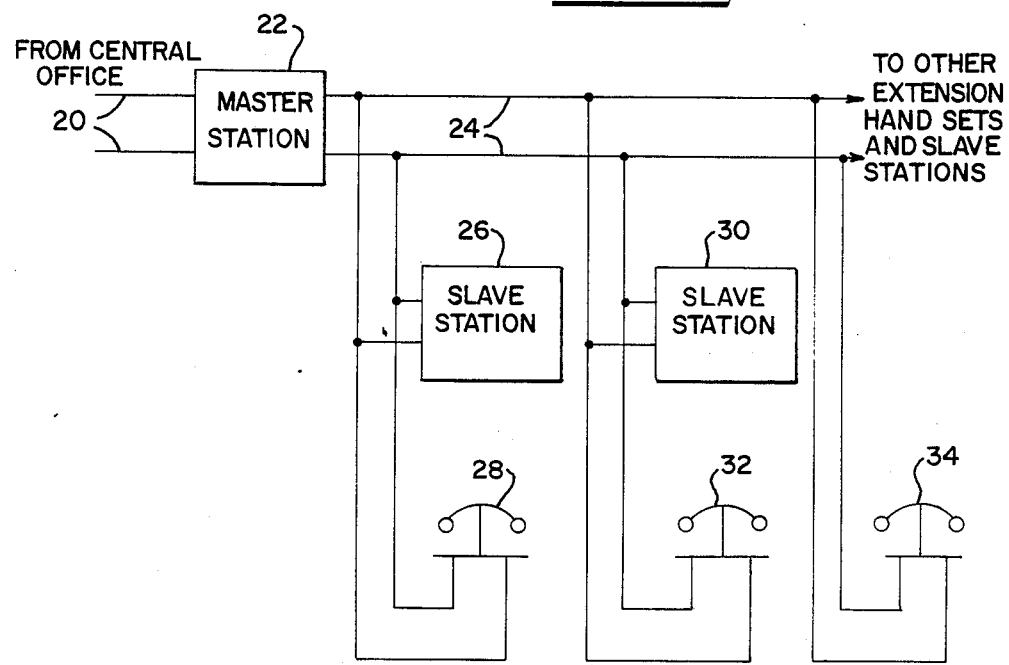
FIG. 1 is an overall block diagram of the intercom system of the present invention.

FIG. 1 is an overall block diagram of the intercom system of the present invention. In FIG. 1, an extension wire pair 20 (tip and ring) is connected from a telephone central office to a master station 22. The wire pair 20 continues past the master station 22 as wire pair 24 to serve a plurality of handsets 28, 32, and 34 connected to the wire pair 24. A slave station 26 is connected to the wire pair 24 near the handset 28. A similar slave station 30 is connected to the wire pair 24 near the handset 32. The handset 34 is shown as connected to the wire pair 24 without an associated slave station. Other handsets and slave stations may be connected to the wire pair 24. The minimum number of components that can be used to practice the invention is the master station 22, the handset 28 at a first location, and the slave station 30 at a second location. However, the utility of the invention is increased by having the slave station 30 near a handset such as the handset 32.

Operation of the circuit illustrated in FIG. 1 is as follows. When the system is not being used as an intercom system, the master station 22 completes the connection of the wire pairs 20 and 24 without further action, and the slave stations 26 and 30 are inactive. Under these circumstances, the handsets 28, 32, and 34 are connected to the wire pair 24 in the same way.

If a person at the handset 28 wants to make an intercom call to all the slave stations 26 and 30, he produces a signal that instructs the master station 22 to interrupt the connection from the wire pair 24 to the central office. The master station 22 will stand ready to receive incoming phone calls, provide an open circuit that lets the incoming call appear to ring, and provide an alert to the handsets that are in the intercom mode. The connection of the outside call to the wire pair 24 will not be made while the intercom is in use. The master station 22 also generates a signal that is received at the slave stations 26 and 30 to tell a listener in the vicinity of the handsets 28 and 32 that someone is being called. Where there are more than two slave stations 26 and 30, all of the slave stations will be addressed by a call that originates from one handset. The handset 34, which lacks a slave station of its own, can listen to intercom calls, and can originate them, but is not capable of being called by intercom page from one of the handsets 28 or 32.

The invention can best be understood by referring to the functions of the elements of FIG. 1. The master station 22 is connected to the phone line in such a way that in the event of a power failure or in the absence of the selection of intercom service, the handsets 28, 32 and 34 are connected to the wire pair 24 as though the intercom system has not been installed. When the master station 22 receives a signal from one of the handsets 28, 32 or 34, the intercom system is enabled. The master station 22 interrupts the connection between the wire pair 20 and the wire pair 24 so that the handsets 28, 32 and 34 are no longer connected through the wire pair 20 to the telephone exchange. At the same time, the master station 22 is connected to the wire pair 20 to receive an addition of an incoming call on the wire pair 20. If such a call is received, the master station 22 develops a signal that is audible to users of the handsets 28, 32 or 34 so that they may interrupt intercom operation and taken an outside call.

The master station 22 sends a signal to the slave stations 26 and 30 that directs the paging mode. In the paging mode, the user of the handset 28, 32 or 34 who originated the paging request has his paging message amplified and presented through a loud speaker at each slave station 26 and 30. The paging mode is terminated when the master station 22 detects the presence of two or more handsets 28, 32 or 34 on the wire pair 24. Communication can then be made from handset to handset, but the paging speakers are disabled. The intercom mode ends when all handsets are returned to their cradles. The master station 22 then reestablishes connection between the wire pair 20 and the wire pair 24.

Any one of the handsets 28, 32 or 34 can send and receive telephone messages as though the intercom system of the present invention were not installed. In addition, any handset can signal the master station 22 to originate a page at all of the slave stations 26 and 30. Words spoken into the transmitter of a handset are communicated to the slave stations 26 and 30 where the words are amplified and applied to speakers. After the master station 22 has ended the paging mode and has switched to the intercom mode, two or more handsets can be used to communicate with each other. When all of the handsets are returned to the cradle, the intercom mode is ended.

The slave stations 26 and 30 are idle when the system of the present invention is not in the intercom mode. When the system enters the intercom mode, a signal from the master station 22 directs each slave station 26 and 30 to amplify an alert tone generated by the master station 22 indicating that the system has entered the intercom mode. The slave station 26 or 30 is then switched to the speaker mode, and anything spoken into the transmitter of the originating handset is amplified and broadcast at each slave station. When one or more additional handsets are lifted from the cradle in response to the page, each slave station is switched out of the speaker mode by a signal from the master station 22, and intercom communication is then available between or among handsets.

FIG. 2 is a block diagram of the master station 22 of the present invention. In FIG. 2, a line 50 represents the telephone wire pair 20 that is connected to the central exchange, and a line 52 represents a telephone wire pair 24 that is connected to the handsets and slave stations of the extension that will be connected as an intercom unit. The line pair 50 is connected by a relay 54 to a line pair 56 that is conneted to line pair 52 by a second relay 58. In normal use, the relays 54 and 58 connect the line pairs 50, 56 and 52 together to provide normal telephone service between the central exchange and the extension.

Operation of the circuit of the present invention is started at a handset which produces a selected DTMF code on the line 52 that is detected at a decoder 60. This in turn produces a signal on a control line 62 that operates either relay 54, relay 58, or both. A detector 66 is responsive to incoming calls on the line 50. If an incoming call is received on the line 50, the detector 66 operates an alert generator 68 that provides an alert tone on the line pair 56. A block 70 indicates symbolically the possibility of interconnecting options as a part of the present invention. These options include automatic dialing, music on hold, call recording, and the like.

When the decoder 60 receives a signal from the line 52 that calls for the paging mode, it supplies a control signal to an encoder 72 which generates a signal instructing the slave stations to go to the paging mode. The signal is coupled from the encoder 72, to the line pair 56, through the relay 58, and to the slave stations. A signal from the encoder 72 is taken to a block 74 that enables the passage of an audio signal on line pair 52 after the coded signal is sent.

The paging mode is desired only as long as a single extension is in use. When one or more additional extensions are taken off hook, a load measuring circuit 76 measures the load on the line pair 52 and directs an encoder 78 to generate a signal to change the slave stations to the intercom mode. The load measuring circuit 76 continues to measure the load on line pair 52. When all of the extensions are cradled, the load measuring circuit 76 produces a signal that directs a relay control circuit 80 to close either relay 54, relay 58, or both to their normal positions.

Figure 3:
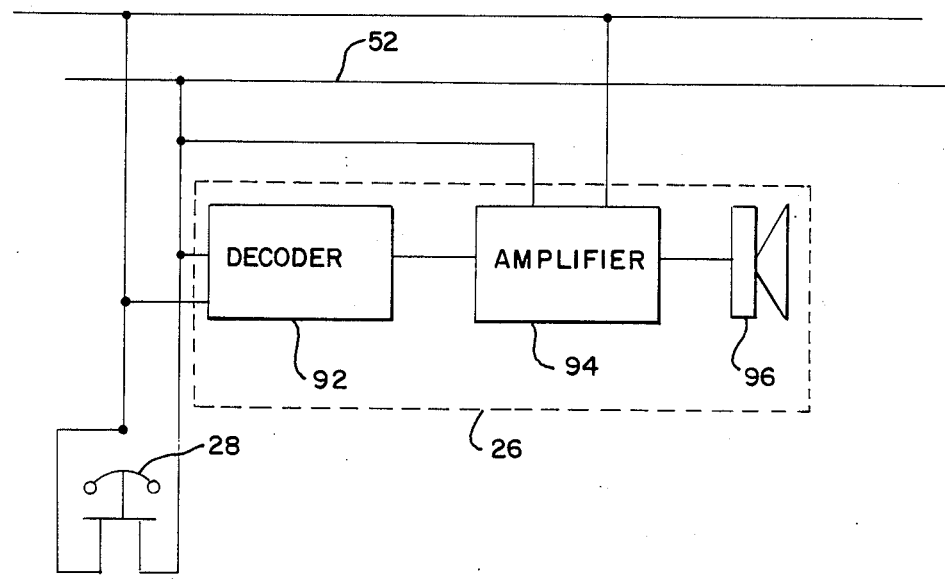
FIG. 3 is a block diagram of a slave station of the present invention.

FIG. 3 is a functional block diagram of a slave station constructed in accordance with the present invention. In FIG. 3, the line pair 52 represents a continuation of the line pair 52 of FIG. 2 which is taken to a plurality of telephone handsets and slave stations. One of the handsets is connected to the line pair 52, as is a decoder 92. The decoder 92 responds to a signal received on the line pair 52 representing an instruction from the master station 22 of FIG. 2 to go into the paging mode. A corresponding enabling signal is passed to an amplifier 94 which amplifies an audio signal that is taken from the line pair 52 and delivers the amplified signal to a speaker 96. The handset 28, or any other handset, that is connected to the line pair 52 can produce a DTMF signal that is received by the master station 22 of FIG. 2 to set up the intercom mode. The master station, in turn, produces a frequency-shift keyed (FSK) signal that is received by the decoder 92, an FSK demodulator, to enable the amplification at each slave station of any signals on the line pair.

It should be understood that the handset 28 can function as a handset and as an intercom originator whether or not it has a slave station 26 such as that shown in FIG. 3. Similarly, a slave station 26 such as that of FIG. 3 can amplify paging messages whether or not it is associated with a handset such as the handset 28. However, the invention would normally be practiced by associating the handset 28 with a slave station 26 such as shown in FIG. 3.

Figure 4A:
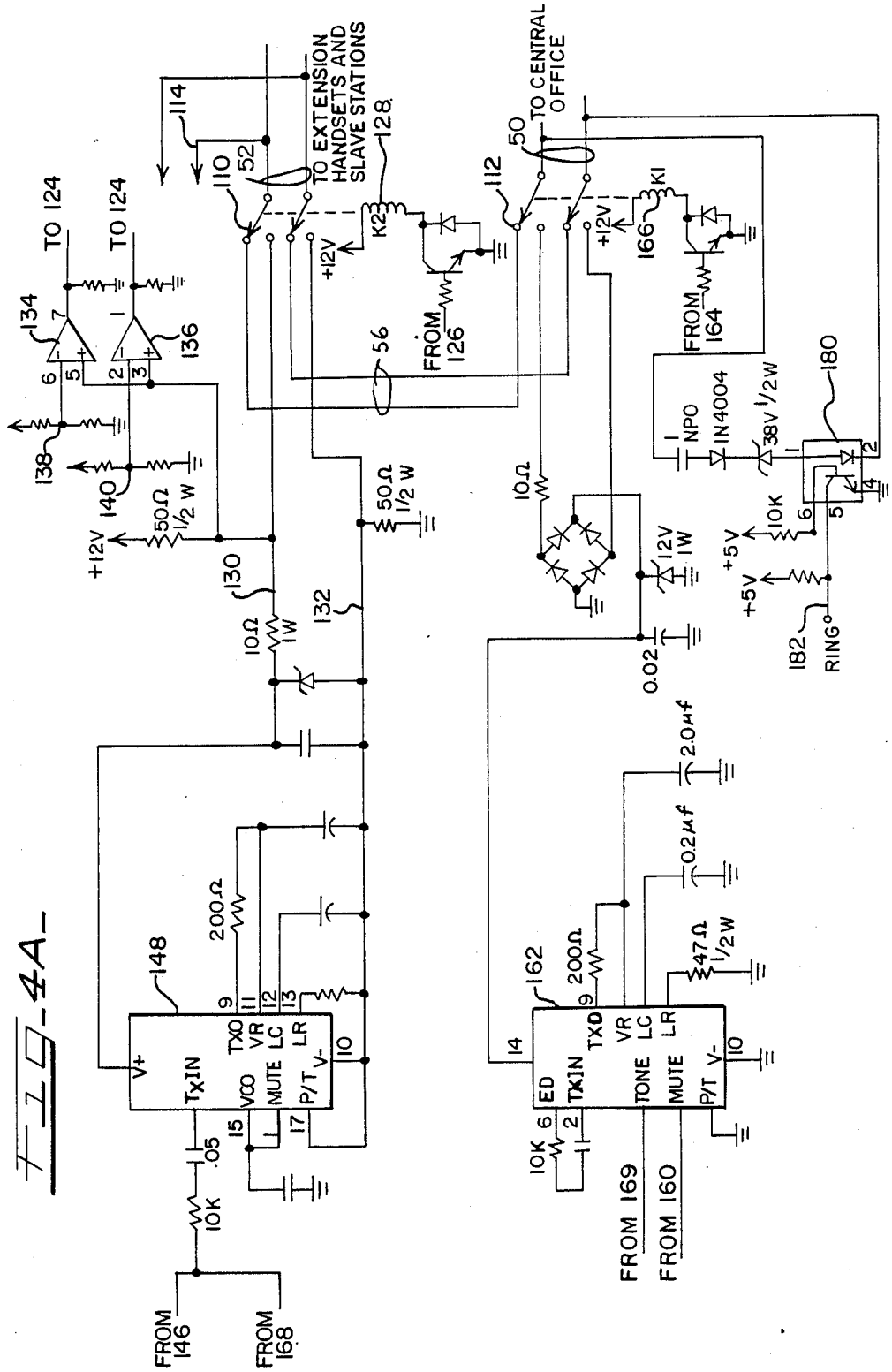

FIGS. 4A and 4B are a detailed circuit diagram of the master station 22 illustrated in FIG. 2. In FIG. 4A, a relay 110 is connected to the telephone handsets and slave stations and to a relay 112, which in turn is connected to the telephone central office. When the relays 110 and 112 are not energized, an electrical connection is made through the relays 110 and 112 that connects the extensions to the central office. When an extension telephone originates a special signal to select intercom service, the special signal is coupled to a line 114 to a DTMF receiver 116. The output of the DTMF receiver 116 is taken to a data bus 118 which supplies an input to a microprocessor 120. An output from the microprocessor 120 is taken to a decoder 122 which supplies a status value to a register 124. The microprocessor 120 also produces an output on a line 126 that is taken to drive the coil 128 of the relay 110. This disconnects the telephone handsets and slave stations from the central office and connects them to the master station. A line 130 is the tip connection and a line 132 is the ring connection. The line 130 is connected to the non-inverting inputs of two comparators 134 and 136. The inverting inputs of the comparators 134 and 136 are connected to voltage dividers 138 and 140, respectively. The voltage dividers 138 and 140 are set so that when no telphones are connected to the tip line 130, neither of the comparators 134 and 136 produces an output. If one telephone is connected on the line, the comparator 134 produces an output, but the comparator 136 does not. If two or more telephones are connected on the line 130, both comparators 134 and 136 produce outputs. The outputs of the comparators 134 and 136 are input to the register 124 which produces status data that is coupled to the microprocessor 120 to indicate the presence of no handsets, one handset, or two or more handsets connected on lines 130, 132.

When one telephone is on the line pair, an encoder 142 produces a signal that is taken to a transmitter 144. The transmitter 144 also receives as an input a signal from terminal 123 of the decoder 122 that is inverted in an inverter 125. The transmitter 142 produces as an output a signal that is taken on a line 146 to a speech network 148 which delivers the signal to the lines 130, 132. If only one extension telephone is currently off hook, the encoder 142 produces a coded signal that directs the slave units to operate in the paging mode. If two or more extension telephones are off hook, the signal from the encoder 142 disables the speakers of the slave stations leaving the handsets in the intercom mode.

The microprocessor 120 produces outputs that are taken to the decoder 122, to a terminal 147 of a register 150, a terminal 149 of a second register 152, and a terminal 143 of the encoder 142. Another output from the microprocessor 120 is taken to a terminal 145 of the encoder 142. Together, the registers 150 and 152 produce the equivalent of keypad outputs that are taken to a DTMF generator 154. The DTMF generator 154 produces a mute output on a line 156 and a tone output on a line 158. The mute output on the line 156 is inverted to produce an inverted mute signal on a line 160 that is taken along with a signal on the line 158 to a speech network 162. The function of the speech network 162 and its associated drivers to provide speed dialing under the control of the microprocessor 120 when the relay 112 is energized. This is done by a signal on a line 164 which comes from microprocessor 120. The signal on the line 164 energizes a coil 166 to operate the relay 112. Speed dialing is just one of the functions that can be controlled by the microprocessor 120 and connected by the relay 112. The tone on the line 158 is also applied through a resistive network 168 to the speech network 148 as an alternative input to the input from the line 146.

A clock oscillator circuit 170 provides a crystal-controlled signal that is taken to the microprocessor 120 on a line 172, to the register 124 on a line 174, to the DTMF receiver 116 on a line 176 and to the DTMF generator 154 on a line 178.

An optical coupler 180 is connected across the tip and ring lines 50 from the central office to provide an isolated indication of the tip-to-ring voltage when the system is in an intercom mode. The output of the optical coupler 180 is taken on a line 182 to the register 124 to provide an external indication of a call when the system is operated as an intercom. At that time, any incoming caller would hear a ring-back signal, while intercom users would receive an alert signal indicating that an outside caller was calling. If all of the handsets were cradled, a person at any one of the handsets could then answer the outside call. In the alternative, the call could be switched through by the operation of a selected DTMF key.

FIG. 5 is a detailed circuit diagram of one of the slave stations of the present invention. In FIG. 5, a tip line 190 and a ring line 192 of line pair 52 are connected to the master station (FIG. 4A) by the closed relay 110. Signals on the lines 190 and 192 are applied to a bridge 194, the output of which is taken as an input on a line 196 to an audio amplifier 198. This in turn drives a speaker 200 to deliver a paging message when the audio amplifier 198 is enabled. FSK signals on the lines 190 and 192 are taken to a phase-locked loop 202, the output of which is taken to a decoder 204. The output of the decoder 204, gated in a comparator 206 with a signal from the bridge 194, is taken to the audio amplifier 198 to inhibit output from the audio amplifier 198 when the paging mode is not desired and to enable the audio amplifier 198 when it is desired to page. Signals that enable the audio amplifier 198 and various other audio signals such as an alert tone originate in the master unit of FIG. 4, but speech signals that are broadcast over the speaker 200 originate in one of the handsets 208 that are attached to the lines 190 and 192.

In summary, if any one of the handsets, such as the handset 28, signals the master station of FIG. 4 for an intercom mode, a signal from the master station enables the audio amplifier 198 of FIG. 5 and the audio signal produced by the handset 28 is then amplified and rendered audible at the speaker 200. When the audio amplifier 198 is disabled in response to a signal from the decoder 204, no further audible signals are produced at the speaker 200. The handset 28 is connected electrically to the lines 190 and 192 to communicate with other such handsets and such connections function as an intercom system.

Table 1 is a list of the integrated circuits that can be used to implement the invention.

TABLE 1

| Element | IC Number |
| --- | --- |
| DTMF Receiver 116 | MT8870 |
| Microprocessor 120 | MC68705 |
| Decoder 122 | MC14028B |
| Register 124 | MC14076B |
| Encoder 142 | MC145026 |
| Modem transmitter 144 | MC14046 |
| Speech network 148 | MC34014 |
| Register 150 | MC14076B |
| Register 152 | MC14076B |
| DTMF generator 154 | TP5089 |
| Speech network 162 | MC34014 |
| Optical coupler 180 | 4N25 |
| Audio amplifier 198 | MC34119 |
| Phase-locked loop 202 | MC14046B |
| Decoder 204 | MC145029 |

The description of the present invention sets forth the best mode known to the inventor for the practice of the invention. However, it should be taken as illustrative and not as limiting, and the scope of the invention should be limited only by the appended claims.

What is claimed is:

1. An apparatus for using a plurality of telephone handsets on a single wire pair connected to a telephone exchange as an extension for an intercom system, the apparatus comprising:

means for disconnecting the single wire pair from the telephone exchange in response to a signal from a first handset;

a slave station connected to the single wire pair including a paging speaker;

means for enabling said paging speaker at said slave station thereby permitting paging from the first handset;

means for disabling the paging speaker when a second handset goes off-hook to enable voice communication between the first handset and the second handset; and means for connecting the single wire pair to the telephone exchange when the first and second handset are go on-hook.

2. The apparatus of claim 1 wherein the means for disconnecting the single wire pair from the telephone exchange comprises:

a DTMF decoder connected to said single wire pair and adapted to receive and decode a DTMF signal from the first handset; and a relay connected to said DTMF decoder and responsive to a signal from said DTMF decoder to disconnect the single wire pair.

3. The apparatus of claim 1 wherein the means for enabling the paging speaker comprises:

a DTMF decoder connected to the single wire pair and responsive to a signal from one of the plurality of telephone handsets to detect a signal from the one of the telephones that calls for intercom operation;

an encoder connected to said DTMF decoder and responsive to an input from said DTMF decoder to generate a signal that is applied to the single wire pair;

a remote decoder connected to the single wire pair at a remote location;

an amplifier connected to the single wire pair at the remote location and responsive to a signal from said remote decoder to enable operation of the amplifier; and wherein said speaker is connected to the amplifier and is responsive to the output of the amplifier to produce an amplified voice signal when enabled by the signal from the remote decoder.

4. The apparatus of claim 1 wherein the means for disabling the paging speaker comprises:

means for measuring the number of handsets that are connected to the single wire pair; and means connected to the single wire pair for generating an intercom disable instruction in response to the measured number of handsets.

5. An apparatus for using a plurality of telephone handsets that are connected to a single wire pair as an intercom system, the apparatus comprising:

a relay connected to the single wire pair to maintain and interrupt an interconnection of the single wire pair to a telephone central exchange;

a DTMF decoder connected to the single wire pair and responsive to a special DTMF signal from one of the handsets to operate the relay so as to disconnect the single wire pair from the telephone central exchange;

means for encoding a paging instruction, the means for encoding connected to said DTMF decoder and responsive to a signal from the decoder to select intercom operation;

a remote decoder disposed and connected to a remote location to the single wire pair;

an audio amplifier connected to the single wire pair and to the decoder to receive an enable signal from the remote decoder to pass and amplify audio signals from the single wire pair; and said remote decoder responsive to a signal from the means for encoding so as to enable said audio amplifier;

a speaker connected to the amplifier to convert the amplified audio from the amplifier into detectable sound.

6. The apparatus of claim 5 comprising, in addition, means connected single wire pair for detecting the electrical connection to the single wire pair of a plurality of handsets and generating a signal disabling operation of the audio amplifier.

7. The apparatus of claim 6 comprising, in addition, means connected to the single wire pair for detecting the presence of an incoming call when the single wire pair is in an intercom mode; and means for signaling connected to said means for detecting to alert a listener at a handset of the presence of an incoming call.

8. An apparatus for using a plurality of telephone handsets on a single wire pair as an intercom system, the apparatus comprising:

a master station including a microprocessor for generating an external signal and means connected to the microprocessor and to the single wire pair for coupling signals, including said external signal, to and from the microprocessor and the single wire pair; and a slave station disposed near a handset, the slave station including an audio amplifier that is enabled and disabled in response to said external signal and a speaker connected to the audio amplifier to render signals amplified by the audio amplifier audible.

9. The apparatus of claim 8 wherein the means for coupling signals comprises:

a DTMF decoder responsive to DTMF signals generated at one of the handsets to call for a switch to a paging mode, the DTMF decoder producing an output signal that is coupled to the microprocessor; and a tone generator connected to the microprocessor and responsive to instructions from the microprocessor to direct the paging mode and an intercom mode at the slave station.

10. The apparatus of claim 9 comprising in addition means connected to the microprocessor for detecting the number of telephone handsets that are off hook.

11. The apparatus of claim 10 comprising in addition means connected to the microprocessor for selecting paging when one telephone handset is off hook and selecting intercom when two telephone handsets are off hook.

12. The apparatus of claim 8 comprising in addition means for detecting an incoming call from a central station while the handsets are in use as an intercom system.

13. The apparatus of claim 12 comprising in addition means connected to the microprocessor and to the detecting means for alerting said handsets of an incoming call.

14. The apparatus of claim 8 comprising in addition means disposed at the master station for effecting speed dialing upon receipt of a command from a handset.

15. The apparatus of claim 8 comprising in addition: means connected to said single wire pair for holding an outside call received while the handsets are in use as an intercom system.

* * * * *

UNITED STATES PATENT AND TRADEMARK OFFICE
CERTIFICATE OF CORRECTION

PATENT NO. : 4,893,334
DATED : January 9, 1990
INVENTOR(S) : Nicholas G. Parnello It is certified that error appears in the above-identified patent and that said Letters Patent is hereby corrected as shown below:

Column 2, line 23, delete "()" and insert --(#)--;

Column 3, line 62, delete "has" and insert --had--;

Column 4, line 2, delete "addition" and insert --indication--;

Column 5, line 62, delete "to" and insert --on--;

Column 6, line 48, after "drivers", insert --is--;

Column 8, line 14, delete "handset" and insert --handsets--;

Column 8, line 17, delete "are";

and

Column 9, line 16, after "connected", insert --to the--.

Signed and Sealed this

Nineteenth Day of March, 1991

*Attest:*

HARRY F. MANBECK, JR.

*Attesting Officer*     *Commissioner of Patents and Trademarks*